(12) United States Patent
Suzuki et al.

(10) Patent No.: US 12,500,849 B2
(45) Date of Patent: Dec. 16, 2025

(54) COMMUNICATION RELAYING METHOD, COMMUNICATION RELAYING APPARATUS, AND NON-TRANSITORY COMPUTER-READABLE RECORDING MEDIUM

(71) Applicant: Yamaha Corporation, Hamamatsu (JP)

(72) Inventors: Shuntaro Suzuki, Shizuoka (JP); Hirokazu Suzuki, Kanagawa (JP)

(73) Assignee: Yamaha Corporation, Hamamatsu (JP)

( * ) Notice: Subject to any disclaimer, the term of this patent is extended or adjusted under 35 U.S.C. 154(b) by 0 days.

(21) Appl. No.: 18/598,046

(22) Filed: Mar. 7, 2024

(65) Prior Publication Data

US 2024/0305581 A1    Sep. 12, 2024

(30) Foreign Application Priority Data

Mar. 8, 2023    (JP) .................................. 2023-035641

(51) Int. Cl.
*G06F 3/16* (2006.01)
*H04L 47/2416* (2022.01)
*H04L 47/36* (2022.01)
*H04L 47/625* (2022.01)
*H04L 47/6275* (2022.01)

(52) U.S. Cl.
CPC ...... *H04L 47/6275* (2013.01); *H04L 47/2416* (2013.01); *H04L 47/365* (2013.01); *H04L 47/6255* (2013.01)

(58) Field of Classification Search
CPC ............. H04L 47/6275; H04L 47/2416; H04L 47/365; H04L 47/6255; H04L 12/26; H04L 12/28; H04L 47/62
USPC .......................................................... 709/238
See application file for complete search history.

(56) References Cited

U.S. PATENT DOCUMENTS

| | | | |
|---|---|---|---|
| 9,780,752 B2* | 10/2017 | Schober | H03G 5/16 |
| 10,206,039 B1* | 2/2019 | Yun | H04R 3/12 |
| 2003/0095560 A1* | 5/2003 | Arita | H04L 49/351 |
| | | | 370/431 |
| 2011/0211524 A1* | 9/2011 | Holmes | H04N 7/18 |
| | | | 370/328 |
| 2012/0093027 A1* | 4/2012 | Asano | H04L 43/0894 |
| | | | 370/253 |
| 2016/0157008 A1* | 6/2016 | Zhang | H04R 1/1041 |
| | | | 381/74 |
| 2018/0301000 A1* | 10/2018 | Israr | G06N 3/0455 |
| 2022/0191611 A1* | 6/2022 | Nam | H04R 1/1016 |

FOREIGN PATENT DOCUMENTS

JP    WO 2009/142216 A1    9/2011

* cited by examiner

*Primary Examiner* — Jude Jean Gilles
(74) *Attorney, Agent, or Firm* — Crowell & Moring LLP

(57) ABSTRACT

A communication relaying method includes receiving an analogue sound signal. The method also includes converting the received analogue sound signal into a digital sound signal. The method also includes packetizing the digital sound signal into a first IP packet. The method also includes receiving a second IP packet. The method also includes transmitting the first IP packet with priority over the second IP packet.

16 Claims, 18 Drawing Sheets

COMMUNICATION RELAYING METHOD, COMMUNICATION RELAYING APPARATUS, AND NON-TRANSITORY COMPUTER-READABLE RECORDING MEDIUM

CROSS-REFERENCE TO RELATED APPLICATIONS

The present application claims priority under 35 U.S.C. § 119 to Japanese Patent Application No. 2023-035641, filed Mar. 8, 2023. The contents of this application are incorporated herein by reference in their entirety.

BACKGROUND

The present disclosure relates to a communication relaying method, a communication relaying apparatus, and a non-transitory computer-readable recording medium.

WO2009-142216 discloses a communication device that distributes sound data and moving image data. The communication device includes a content holding unit that performs packet monitoring and transmits content directly to a client device, without intervention of a server, in an attempt to reduce a network load.

WO2009-142216 does not involve any special control related to sound.

It is an object of the present disclosure to provide a communication relaying method suitable for an ensemble of performers working together from different locations. It is another object of the present disclosure to provide a communication relaying apparatus suitable for an ensemble of performers working together from different locations. It is another object of the present disclosure to provide a non-transitory computer-readable recording medium suitable for an ensemble of performers working together from different locations.

SUMMARY

One aspect is a communication relaying method that includes receiving an analogue sound signal. The method also includes converting the received analogue sound signal into a digital sound signal. The method also includes packetizing the digital sound signal into a first IP packet. The method also includes receiving a second IP packet. The method also includes transmitting the first IP packet with priority over the second IP packet.

Another aspect is a communication relaying apparatus that includes an audio interface, an AD converter, a packetizer, a communication interface, and a communication controller. The audio interface is configured to receive an analogue sound signal. The AD converter is configured to convert the received analogue sound signal into a digital sound signal. The packetizer is configured to packetize the digital sound signal into a first IP packet. The communication interface is configured to receive a second IP packet. The communication controller is configured to transmit the first IP packet with priority over the second IP packet.

Another aspect is a non-transitory computer-readable recording medium storing a program. When the program is executed by at least one computer, the program causes the at least one computer to perform a method including receiving an analogue sound signal. The method also includes converting the received analogue sound signal into a digital sound signal. The method also includes packetizing the digital sound signal into a first IP packet. The method also includes receiving a second IP packet. The method also includes transmitting the first IP packet with priority over the second IP packet.

A more complete appreciation of the present disclosure and many of the attendant advantages thereof will be readily obtained as the same becomes better understood by reference to the following detailed description when considered in connection with the following figures, in which:

DETAILED DESCRIPTION

The present specification is applicable to a communication relaying method, a communication relaying apparatus, and a non-transitory computer-readable recording medium.

Figure 1:
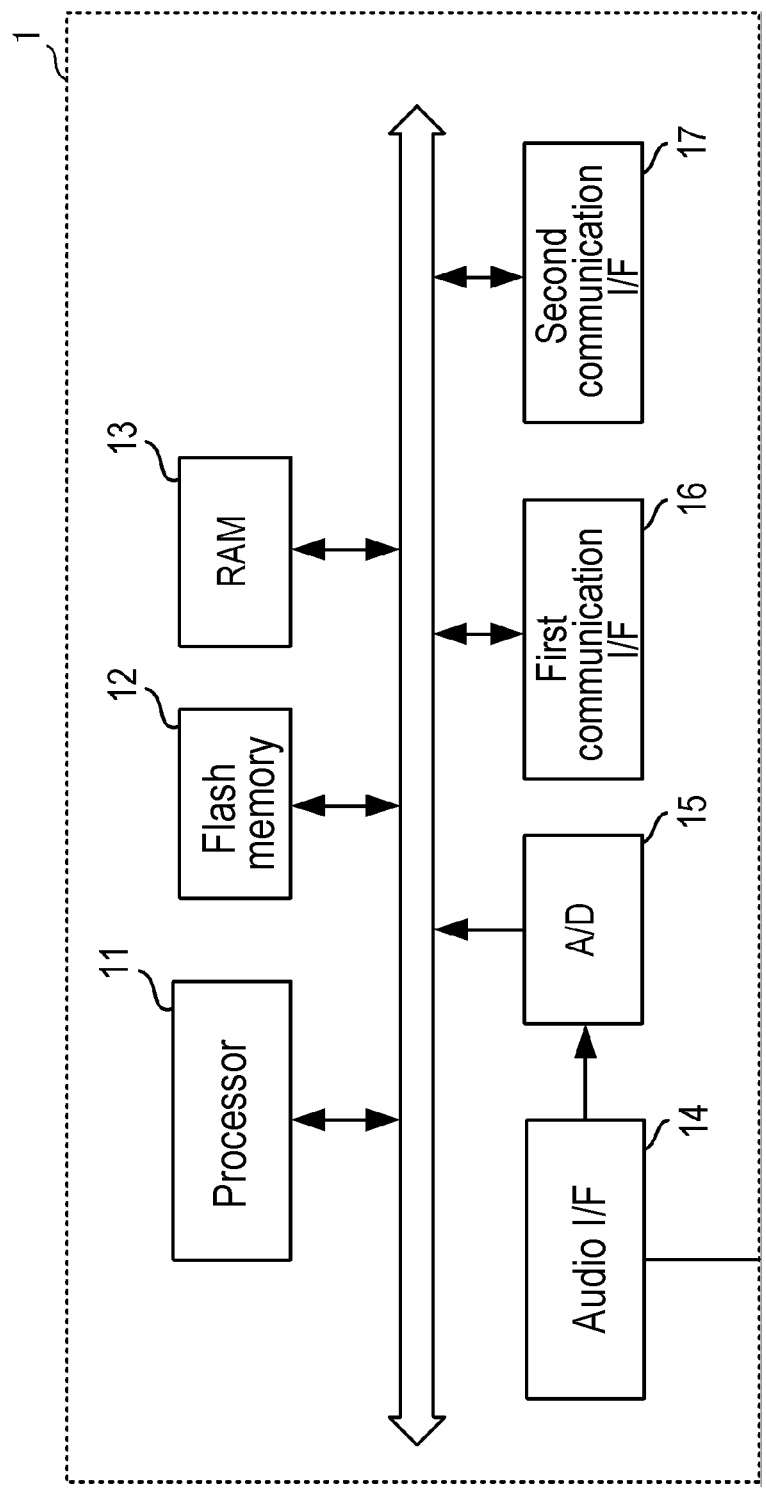
FIG. 1 is a block diagram illustrating a configuration of a communication relaying apparatus 1.

FIG. 1 is a block diagram illustrating a configuration of the communication relaying apparatus 1 according to an embodiment.

The communication relaying apparatus 1 includes the processor 11, a flash memory 12, a random access memory (RAM) 13, an audio interface (I/F) 14, an AD converter 15, a first communication I/F 16, and a second communication I/F 17.

The communication relaying apparatus 1 is a communication apparatus such as a router, a switch, and a wireless local area network (LAN) access point. Another possible example is the communication relaying apparatus 1 is an information processing apparatus such as a smartphone, a personal computer, a set-top box, and an audio receiver. In the embodiment, the communication relaying apparatus 1 will be described as a router.

The processor 11 is made up of, for example, a CPU (central processing unit), a DSP (digital signal processor), or an SoC (System-on-a-Chip). The flash memory 12 is a storage medium and stores programs. The processor 11 reads the programs into the RAM 13 to control the elements of the communication relaying apparatus 1. The flash memory 12 also stores a communication relaying program according to the embodiment. The processor 11 reads the communication relaying program to perform the communication relaying method according to the embodiment.

The audio I/F 14 includes an analogue audio terminal. The audio I/F 14 receives an analogue sound signal through an audio cable. The AD converter 15 converts the analogue sound signal into a digital sound signal. The digital sound signal may be a sound signal of linear PCM, which is an uncompressed form of PCM, or may be a sound signal compressed by an encoding technique.

The audio I/F 14 is used by a user working with other performers from different locations to perform an ensemble. Specifically, the user's sound instrument (such as a musical instrument and a microphone) is connected to the audio I/F 14. It is to be noted that the audio I/F 14 may include an output audio terminal. In this case, the user is able to connect a headphone to the output audio terminal to monitor the sound being played.

An example of the first communication I/F 16 is a LAN interface. The first communication I/F 16 includes, for example, an RJ45 terminal, which is for wiring connection. The second communication I/F 17 is a WAN (Wide Area Network) interface, and includes, for example, a RJ45 terminal, which is for wiring connection. It is to be noted, however, that the first communication I/F 16 and the second communication I/F 17 may be wireless interfaces, instead of being wired interfaces.

Figure 2:
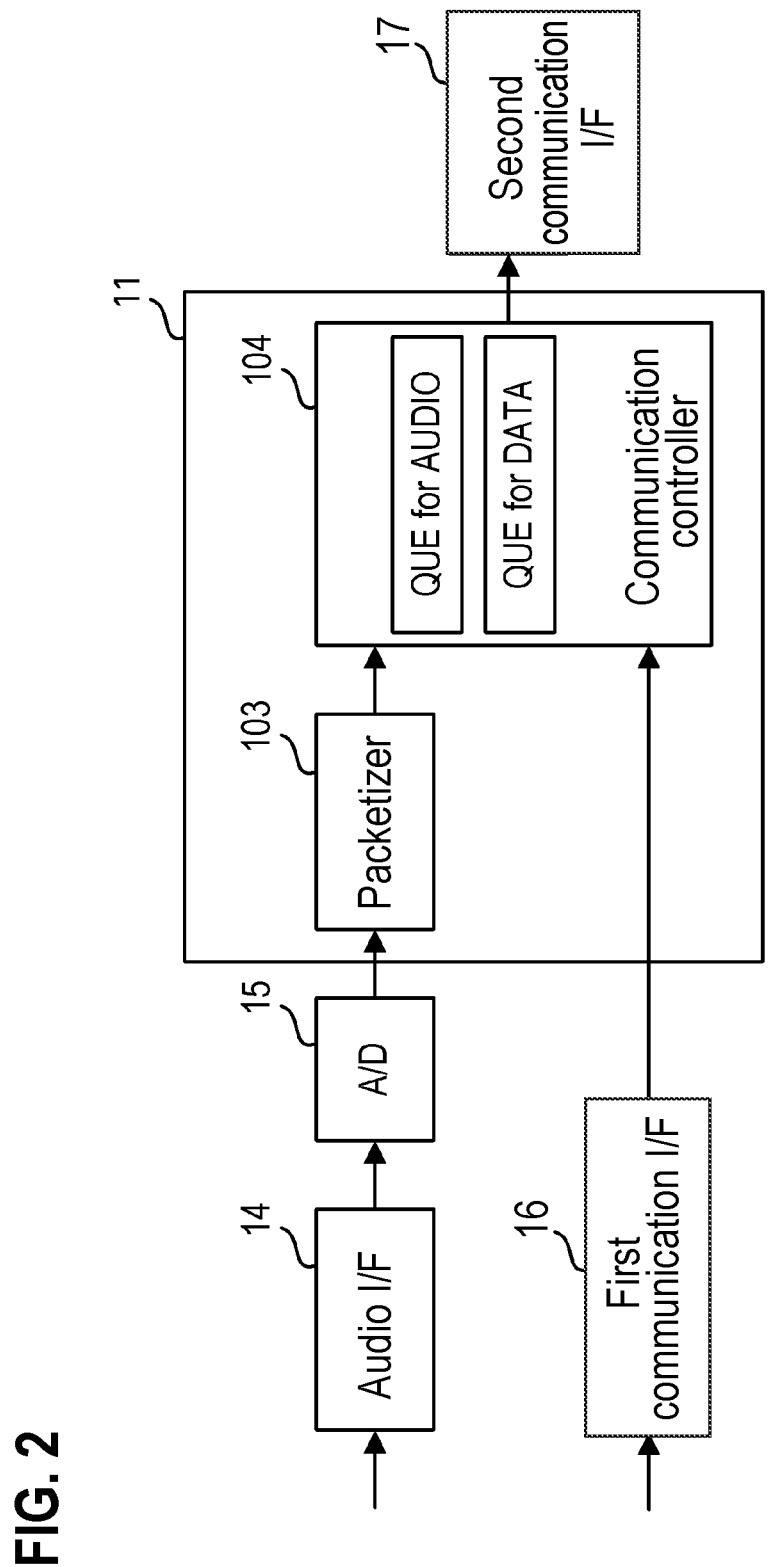
FIG. 2 is a functional block diagram of the communication relaying apparatus 1.

FIG. 2 is a functional block diagram of the processor 11. The processor 11 includes, functionally, a packetizer 103 and the communication controller 104.

Figure 3:
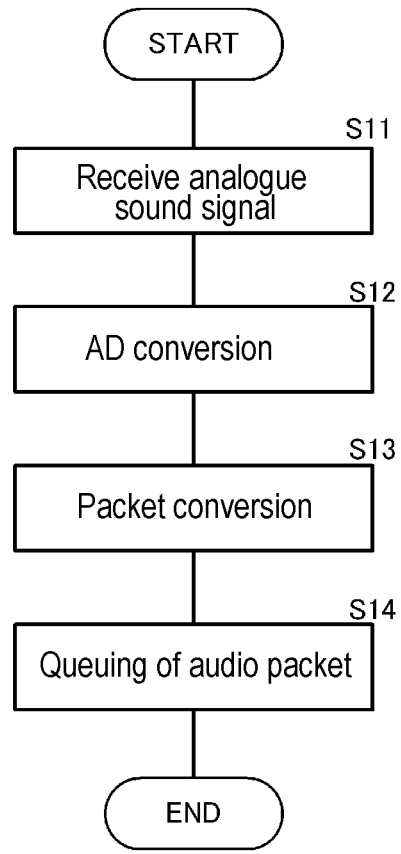
FIG. 3 is a flowchart of sound signal processing included in a communication relaying method.

FIG. 3 is a flowchart of sound signal processing included in the communication relaying method according to the embodiment. The audio I/F 14 receives an analogue sound signal (S11). The AD converter 15 converts the analogue sound signal into a digital sound signal (S12). The packetizer 103 converts the digital sound signal into a first IP packet (S13). The first IP packet will be hereinafter referred to as audio packet. The communication controller 104 performs queuing of the audio packet, that is, adds the audio packet to a first queue (S14). As illustrated in FIG. 2, QUE for AUDIO corresponds to the audio packet received from the audio I/F 14 and packetized.

Figure 4:
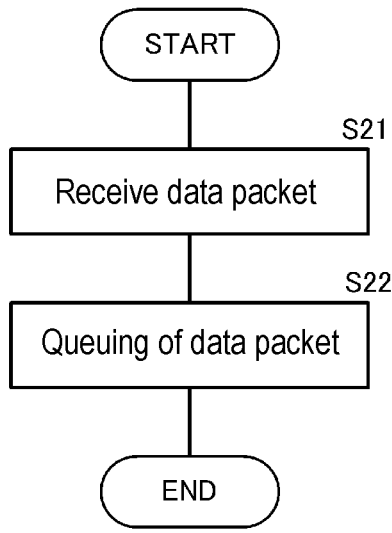
FIG. 4 is a flowchart of data processing other than the sound signal processing included in the communication relaying method.

FIG. 4 is a flowchart of data processing other than the sound signal processing included in the communication relaying method according to the embodiment. The first communication I/F 16 receives a second IP packet (S21). The second IP packet is a data packet. As used herein, the term "data packet" is intended to mean a packet obtained by packetizing data other than the above-described audio packet. The communication controller 104 performs queuing of the data, that is, adds the data packet to a second queue (S22). As illustrated in FIG. 2, QUE for DATA corresponds to the data received from the first communication I/F 16.

Figure 5:
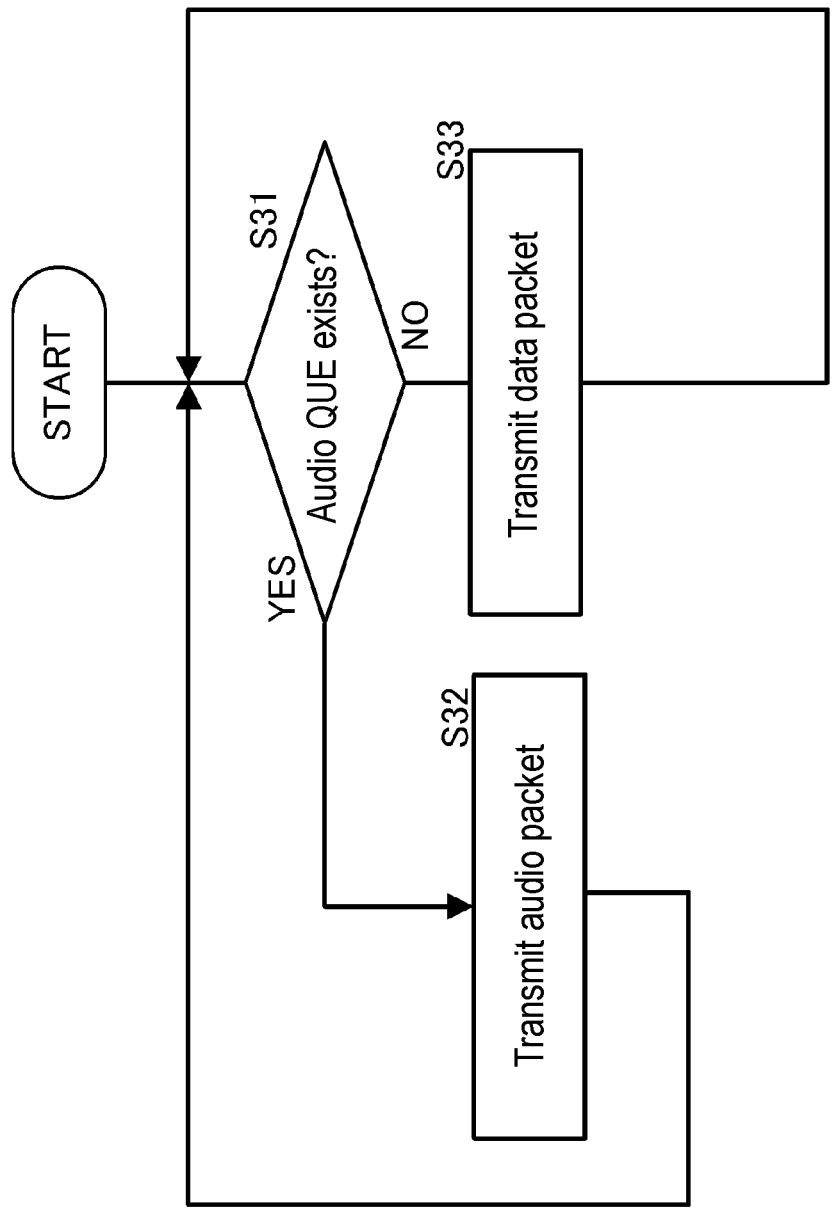
FIG. 5 is a flowchart of transmission processing performed by a communication controller 104.

Then, the communication controller 104 transmits the first IP packet (audio packet) with priority over the second IP packet (data packet). FIG. 5 is a flowchart of transmission processing performed by the communication controller 104.

The communication controller 104 determines whether any audio packet exists in the first queue (S31). In a case where the communication controller 104 has determined that an audio packet exists in the first queue in the determination at S31, the communication controller 104 transmits the audio packet from the second communication I/F 17 (S32). In a case where the communication controller 104 has determined that no audio packet exists in the first queue in the determination at S31, the communication controller 104 transmits the data packet from the second communication I/F 17 (S33).

In this manner, the communication relaying apparatus 1 according to the embodiment transmits the audio packet with priority. While the user is performing an ensemble with other performers from remote locations, the user may connect a sound instrument to the communication relaying apparatus 1 according to the embodiment. The use of the communication relaying apparatus 1 significantly reduces the likelihood of experiencing sound delays or dropouts. This offers the user a customer experience that enables the user to participate in an unconventionally comfortable remote ensemble with other performers.

Figure 6:
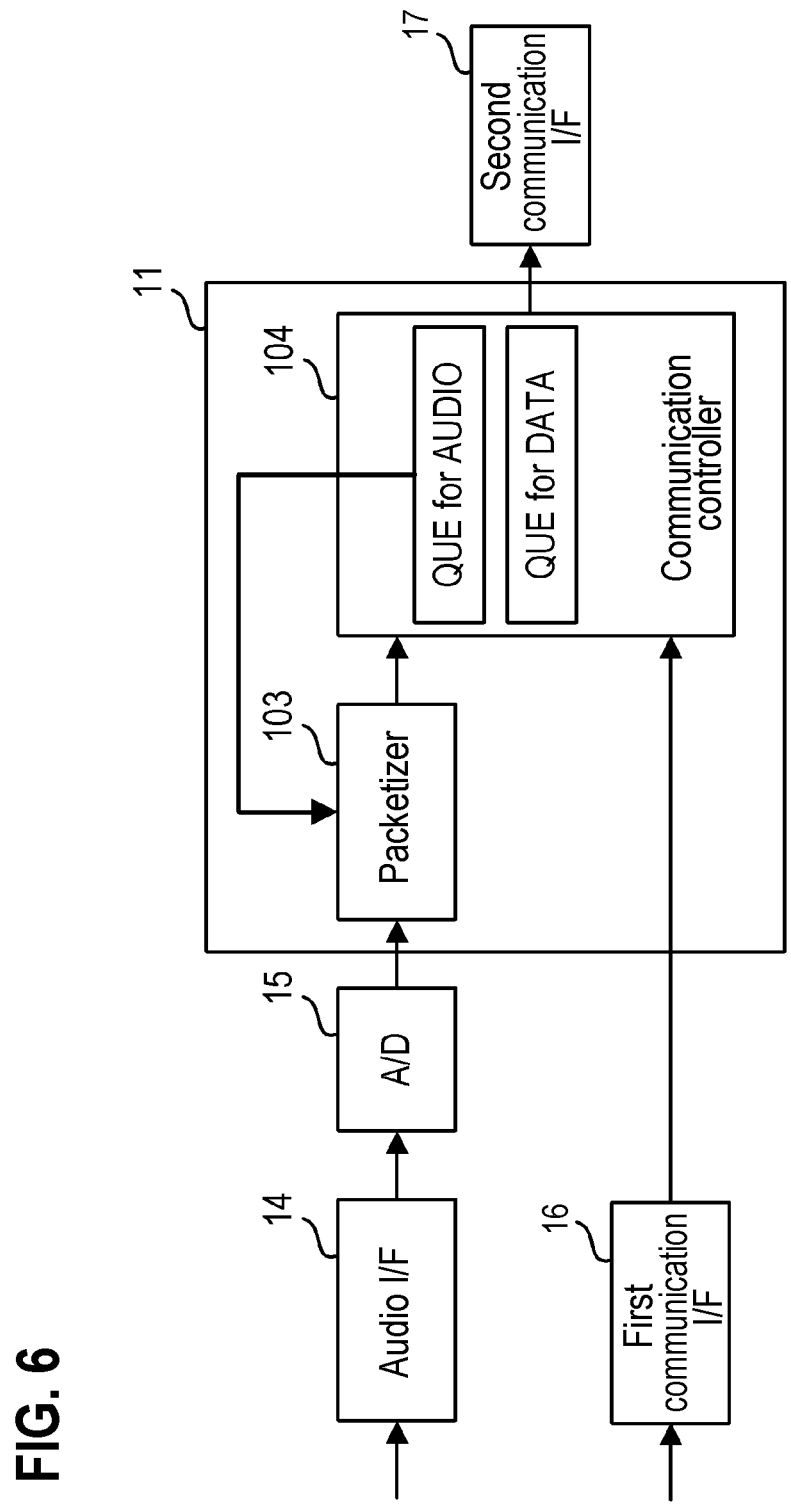
FIG. 6 is a functional block diagram of a processor 11.

FIG. 6 is a functional block diagram of the processor 11 according to modification 1. The communication controller 104 according to modification 1 monitors the first queue of the audio packet. In a case where the first queue of the audio packet has reached a predetermined value, the communication controller 104 instructs the packetizer 103 to change the data size of the audio packet.

For example, in a case where the first queue of the audio packet has reached a predetermined value, the communication controller 104 increases the data size per packet. Thus, the communication controller 104 reduces the header size to reduce the overhead (which is the ratio of the header size to the audio data size). Thus, the communication controller 104 quickly reduces the value of the first queue of the audio packet. This significantly reduces the likelihood of experiencing sound delays or dropouts. Also, for example, in a case where the first queue of the audio packet has become less than the predetermined value, the communication controller 104 reduces the data size per packet. This ensures that in a case where there is no likelihood of experiencing sound delays or dropouts, the communication controller 104 shortens the waiting time for the data packet.

Figure 7:
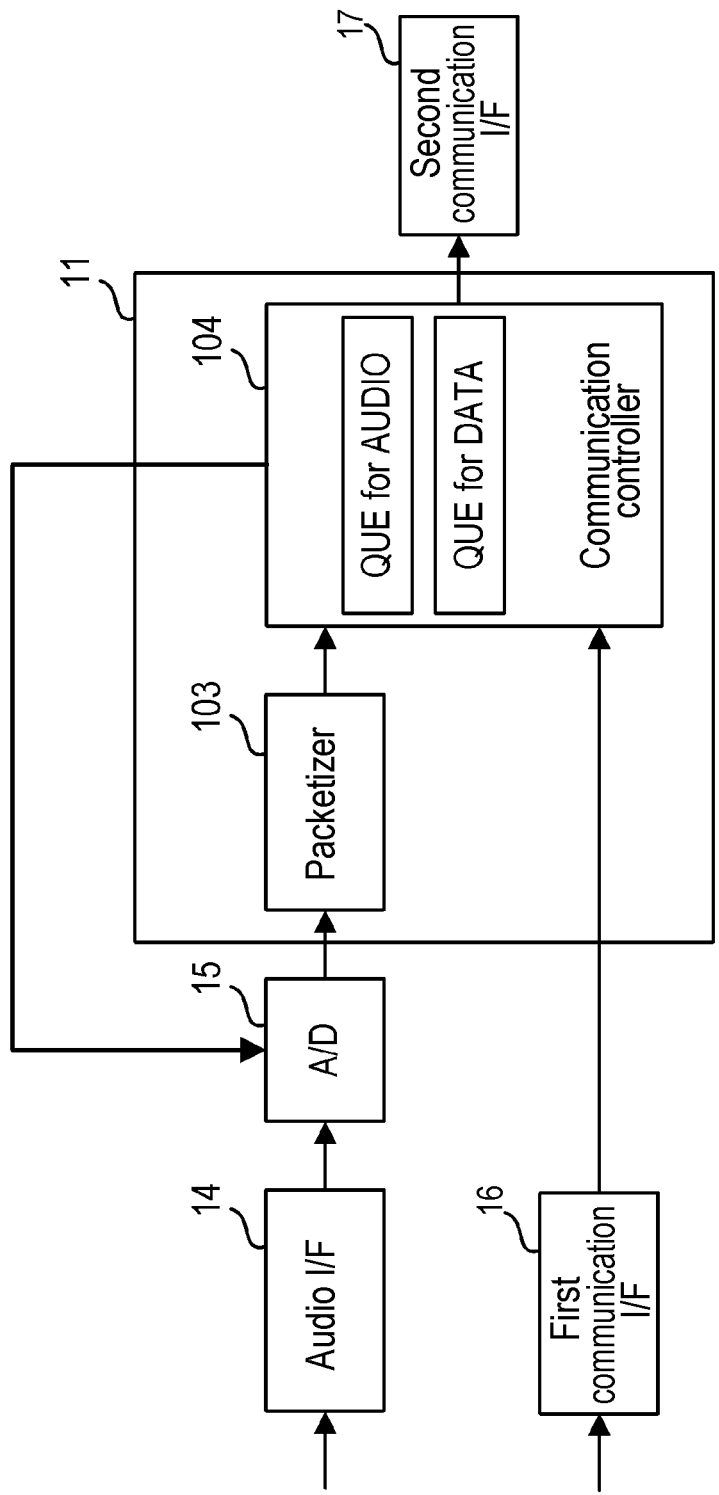
FIG. 7 is a functional block diagram of the processor 11.

FIG. 7 is a functional block diagram of the processor 11 according to modification 2. The communication controller 104 according to modification 2 monitors the first queue of the audio packet. In a case where the first queue of the audio packet has reached a predetermined value, the communication controller 104 instructs the AD converter 15 to change a codec that converts an analogue sound signal into a digital sound signal.

For example, in a case where the first queue of the audio packet has reached a predetermined value, the communication controller 104 changes an uncompressed audio codec (for example, linear PCM) to a compressed audio codec (for example, MP3). Also in a case where the first queue of the audio packet has reached a predetermined value, the communication controller 104 may change the codec to a codec with a higher compressibility (for example, from an MP3 codec to an AAC (Advanced Audio Coding)). As used herein, the phrase "change a codec" is intended to encompass decreasing the sampling frequency (for example, changing the sampling frequency 96 kHz to 48 kHz) or decreasing the number of bits (for example, changing from 24 bits to 16 bits). In this manner, the data size of the audio packet is reduced.

By reducing the data size of the audio packet, the communication controller 104 quickly shortens the first queue of the audio packet to significantly minimize the likelihood of experiencing sound delays or dropouts. Also, in a case where the first queue of the audio packet has become less than the predetermined value, the communication controller 104 increases the data size of the audio packet. This ensures that in a case where there is no likelihood of experiencing sound delays or dropouts, the communication controller 104 is able to transmit audio data with higher sound quality.

Figure 8:
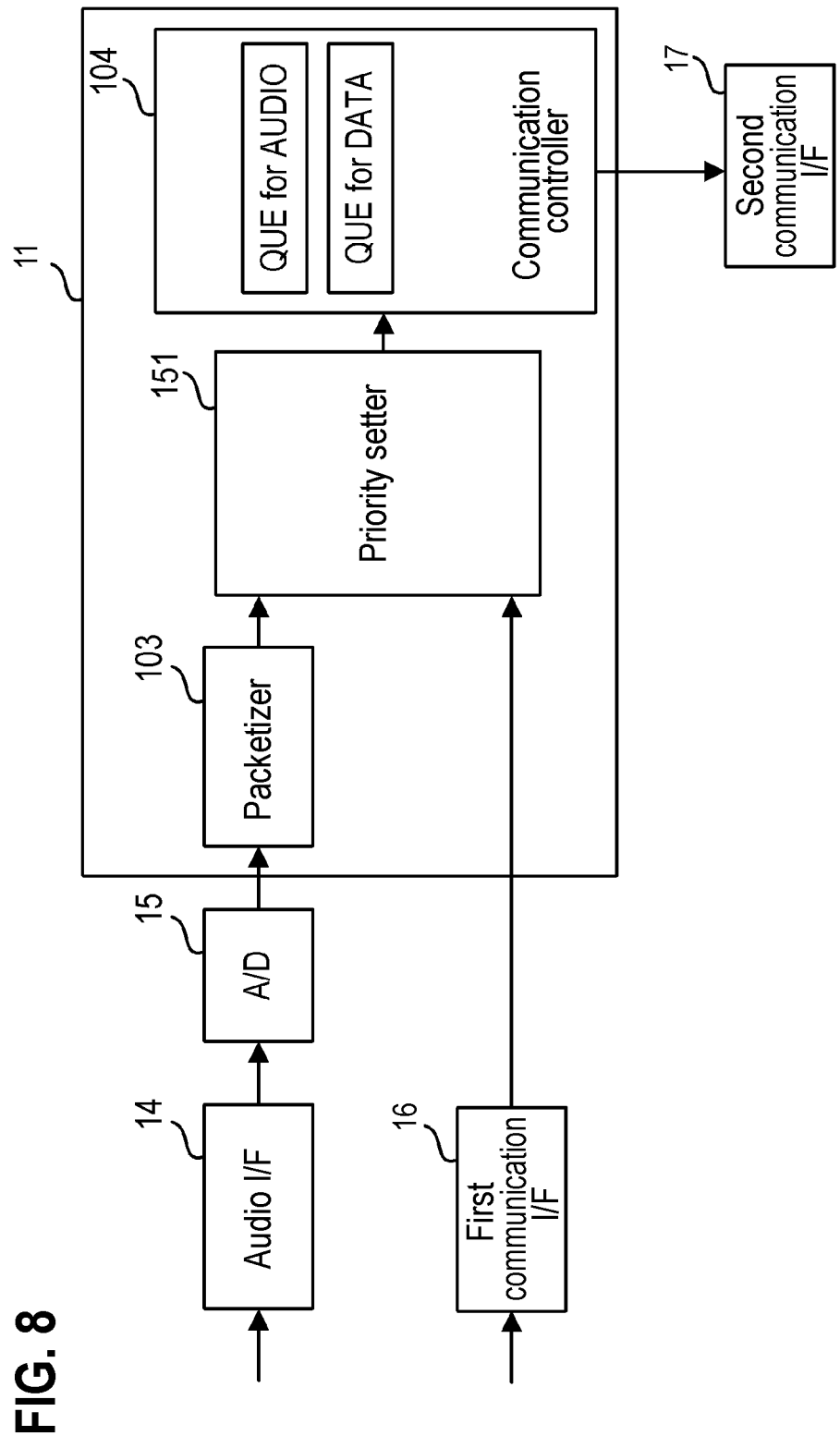
FIG. 8 is a functional block diagram of the processor 11.

FIG. 8 is a functional block diagram of the processor 11 according to modification 3. The processor 11 according to modification 3 includes a priority setter 151, in addition to the elements illustrated in FIG. 2. The priority setter 151 assigns a priority to the header of the audio packet and the header of the data packet. For example, the priority setter 151 assigns a highest priority to the header of the audio packet.

The communication controller 104 transmits the audio packet and the data packet from the second communication I/F 17 by any method such as absolute priority, dynamic priority, and weighted round-robin scheduling. In absolute priority, higher priority queues are given higher precedence. In dynamic priority, longer waiting-time queues are given higher precedence. In weighted round-robin scheduling, an upper limit is imposed on the processing time.

Thus, the phrase "the first IP packet is transmitted with priority over the second IP packet", as used herein, will not be limited to processing the first queue of the audio packet before processing the second queue of the data packet. For example, if the waiting time of the second queue of the data packet is long, there may be a case where the second queue of the data packet is processed before the first queue of the audio packet is processed. For another example, a data packet of an application program for transmitting and receiving a sound signal may be assigned a higher priority than the priority assigned to the audio packet. An example of the application program for transmitting and receiving a sound signal is a remote calling application program that transmits and receives conversation sound data. The conversation sound data corresponds to the data packet, which corresponds to the second IP packet according to the embodiment. The conversation sound data packet, however, may be assigned a higher priority than the priority assigned to the audio packet, which corresponds to the first IP packet. This minimizes the likelihood of experiencing conversation sound dropouts. Another example of the application program for transmitting and receiving a sound signal is a remote ensemble application program that transmits and receives, for example, musical performance sound data, metronome sound data, and sound data of audio content. The musical performance sound data, metronome sound data, and sound data of audio content corresponds to the data packet, which is the second IP packet according to the embodiment. The data packets of the musical performance sound data, metronome sound data, or sound data of audio content, however, may be assigned a higher priority than the priority assigned to the audio packet, which corresponds to the first IP packet. This minimizes the likelihood of experiencing dropouts of the musical performance sound data, metronome sound data, or sound data of audio content.

Figure 9:
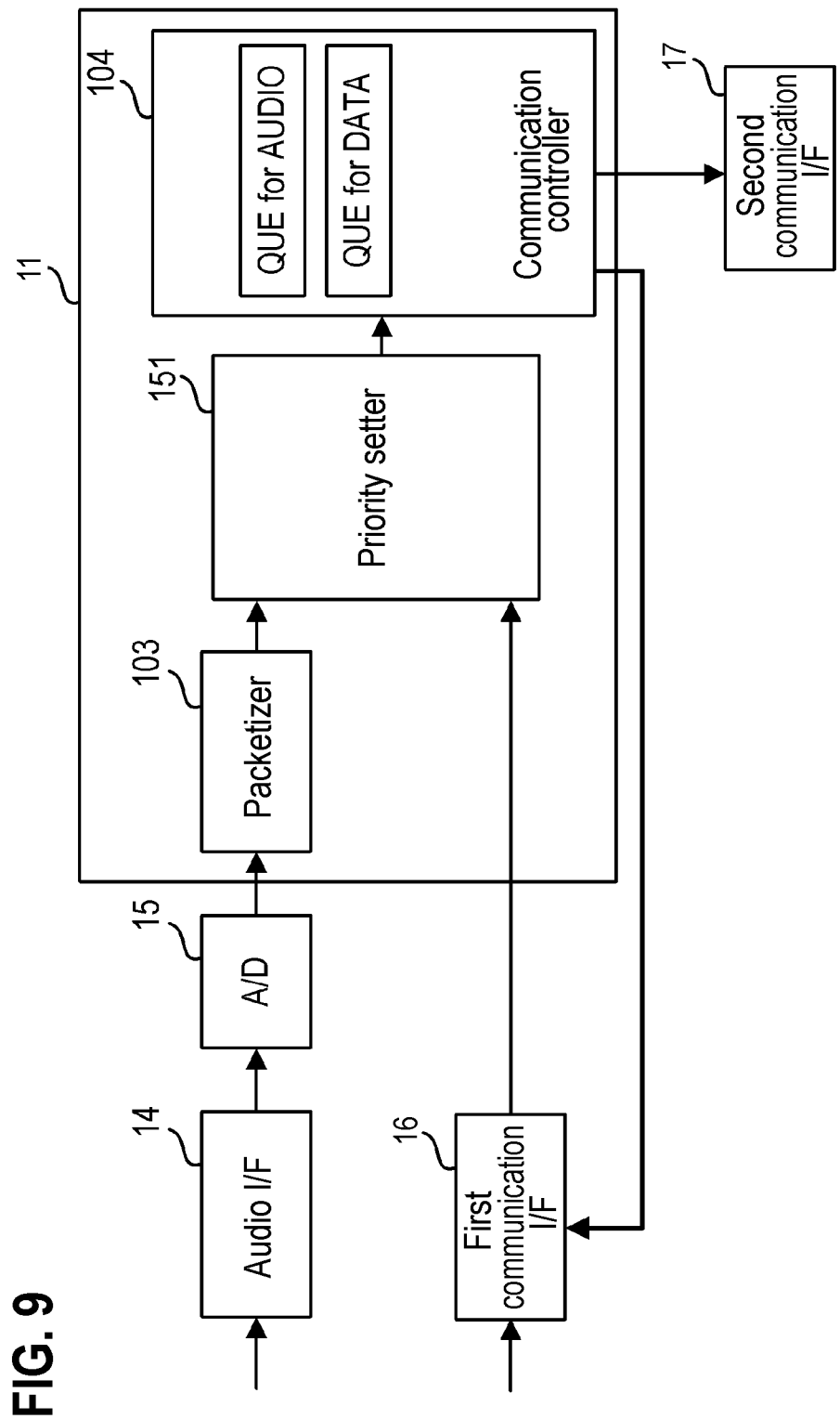
FIG. 9 is a functional block diagram of the processor 11.

FIG. 9 is a functional block diagram of the processor 11 according to modification 4. The processor 11 according to modification 4 includes elements similar to the elements according to modification 3, which is illustrated in FIG. 8. The communication controller 104 according to modification 4 monitors the first queue of the audio packet. In a case where the first queue of the audio packet has reached a predetermined value, the communication controller 104 instructs the first communication I/F 16 to change flow control of data inflowing.

For example, in a case where the first queue of the audio packet has reached a predetermined value, the communication controller 104 turns ON flow control of the first communication I/F 16. The first communication I/F 16 restricts the amount of inflowing data by, for example, transmitting a Pause packet or a collision signal to the instrument from which data is being transmitted. This ensures that the communication controller 104 quickly reduces the value of the first queue of the audio packet. This significantly reduces the likelihood of experiencing sound delays or dropouts. Also, for example, in a case where the first queue of the audio packet has become less than the predetermined value, the communication controller 104 turns OFF the flow control of the first communication I/F 16. This ensures that in a case where there is no likelihood of experiencing sound delays or dropouts, the communication controller 104 shortens the waiting time of the data packet.

Figure 10:
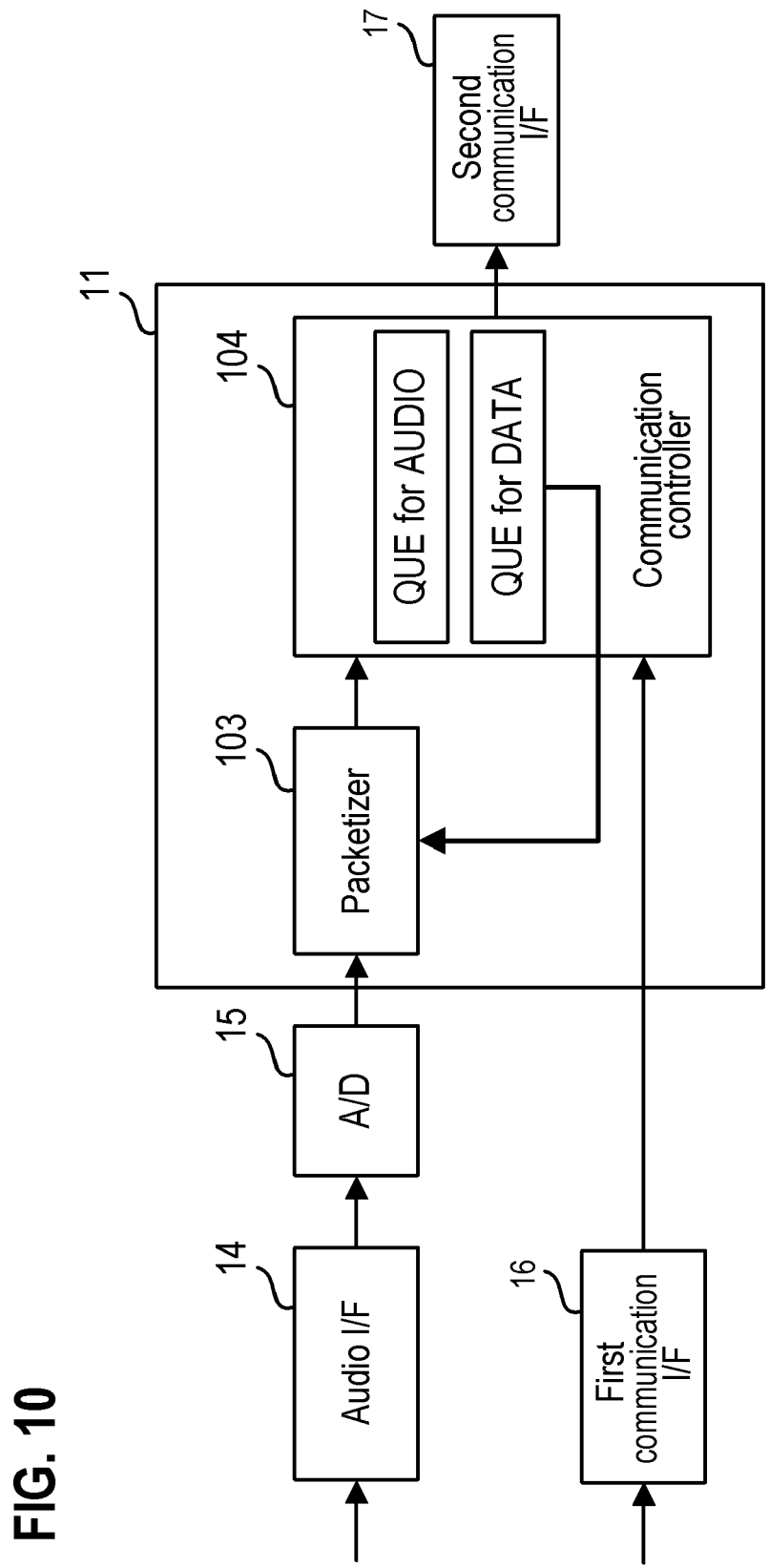
FIG. 10 is a functional block diagram of the processor 11.

FIG. 10 is a functional block diagram of the processor 11 according to modification 5. The communication controller 104 according to modification 5 monitors the second queue of the data packet. In a case where the first queue of the audio packet has reached a predetermined value, the communication controller 104 instructs the packetizer 103 to change the data size of the audio packet.

For example, in a case where the second queue of the data packet has reached a predetermined value, the communication controller 104 increases the data size per packet. Thus, the communication controller 104 reduces the header size to reduce the overhead. Thus, the communication controller 104 quickly reduces the value of the first queue of the audio packet. This shortens the waiting time of the data packet.

Figure 11:
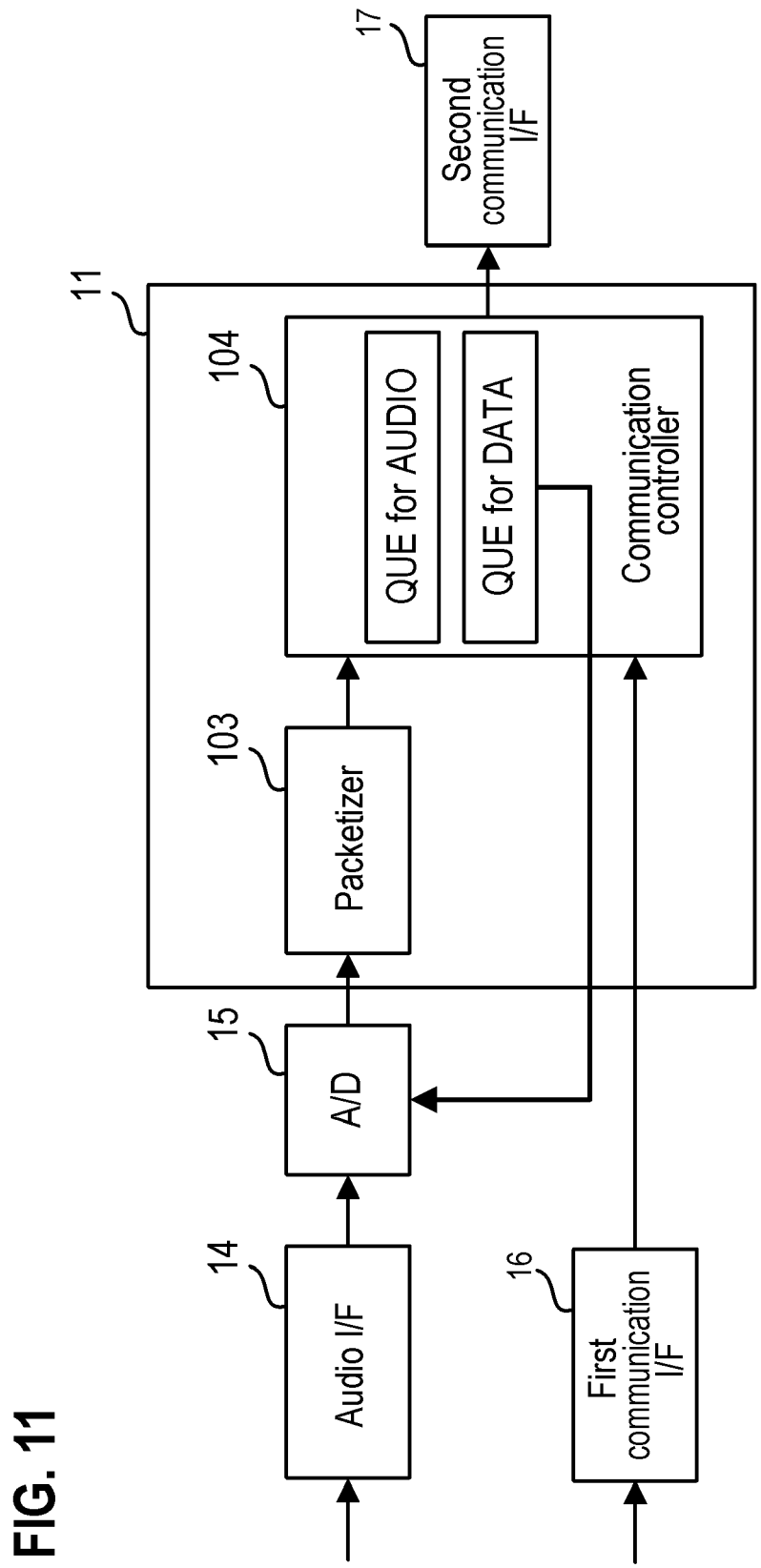
FIG. 11 is a functional block diagram of the processor 11.

FIG. 11 is a functional block diagram of the processor 11 according to modification 6. The communication controller 104 according to modification 6 monitors the second queue of the data packet. In a case where the second queue of the data packet has reached a predetermined value, the communication controller 104 instructs the AD converter 15 to change a codec that converts an analogue sound signal into a digital sound signal.

For example, in a case where the second queue of the data packet has reached a predetermined value, the communication controller 104 changes an uncompressed audio codec (for example, linear PCM) to a compressed audio codec (for example, MP3). Also in a case where the second queue of the audio packet has reached a predetermined value, the communication controller 104 may change the codec to a codec with a higher compressibility (for example, from an MP3 codec to an AAC (Advanced Audio Coding)). As used herein, the phrase "change a codec" is intended to encompass decreasing the sampling frequency (for example, changing the sampling frequency 96 kHz to 48 kHz) or decreasing the number of bits (for example, changing from 24 bits to 16 bits).

By reducing the data size of the audio packet, the communication controller 104 quickly shortens the first queue of the audio packet, shortening the waiting time of the data packet.

Figure 12:
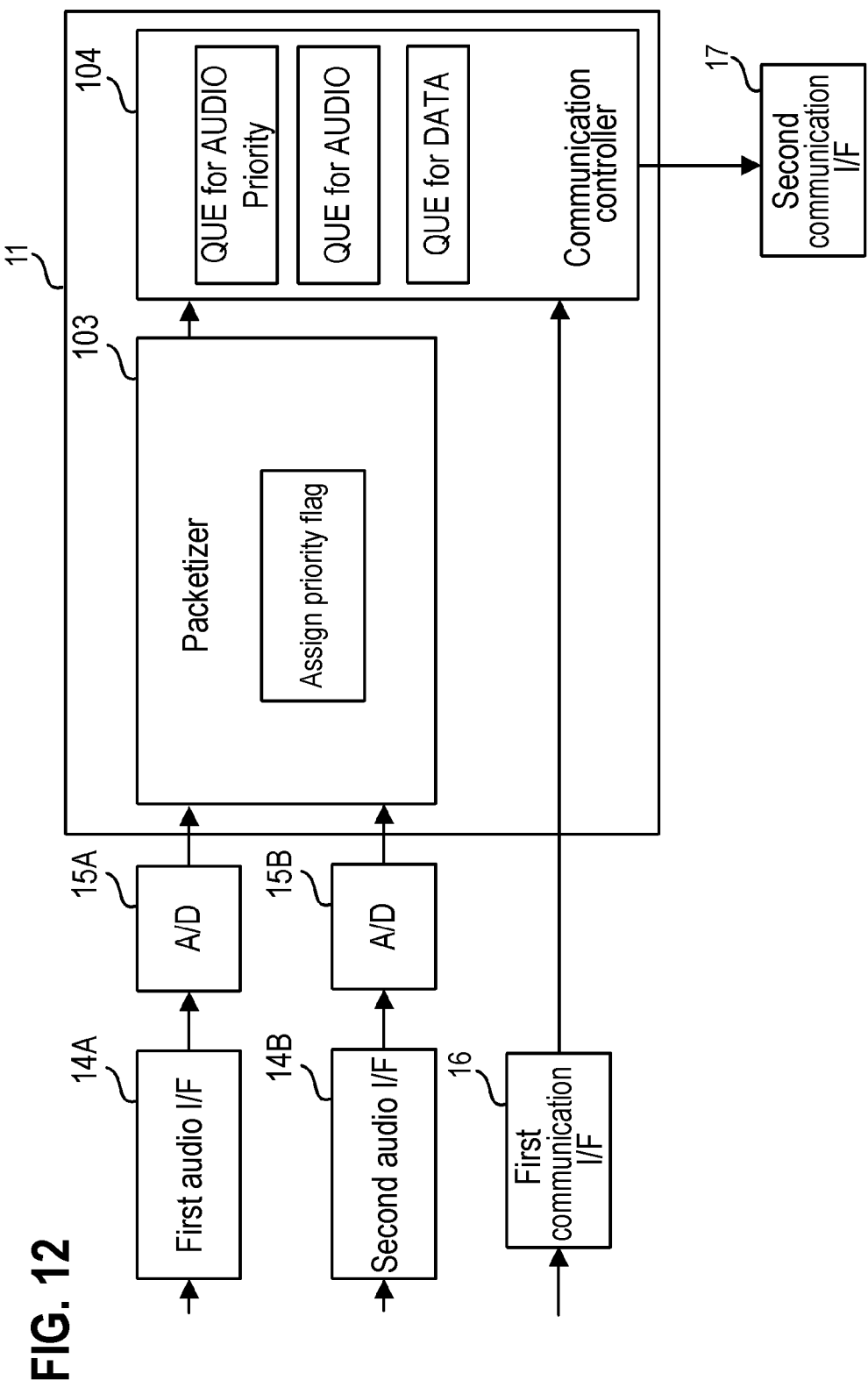
FIG. 12 is a functional block diagram of hardware and the processor 11 of the communication relaying apparatus 1.

FIG. 12 is a functional block diagram of hardware and the processor 11 of the communication relaying apparatus 1 according to modification 7. The communication relaying apparatus 1 according to modification 7 includes a first audio I/F 14A, a second audio I/F 14B, a first AD converter 15A, and a second AD converter 15B.

The first audio I/F 14A receives a first analogue sound signal. The second audio I/F 14B receives a second analogue sound signal. The first AD converter 15A converts the first analogue sound signal into a first digital sound signal. The second AD converter 15B converts the second analogue sound signal into a second digital sound signal.

For example, the user connects a musical instrument to the first audio I/F 14A and connects a microphone to the second audio I/F 14B. Another possible example is that a first user connects the first user's musical instrument to the first audio I/F 14A, and a second user connects the second user's musical instrument to the second audio I/F 14B.

The packetizer 103 assigns a priority flag to a digital sound signal that is the first digital sound signal or the second digital sound signal and that has a predetermined feature. In this manner, the packetizer 103 generates an audio packet (which is QUE for AUDIO Priority in FIG. 12). As used herein, the term "predetermined feature" is intended to mean a feature of sound generated by a musical instrument that keeps rhythm in a musical piece (rhythm instrument or percussion instrument). Examples of such sound include drum sound and base sound. The packetizer 103 extracts a feature quantity of the received digital sound signal. As used herein, the term "feature quantity" is intended to encompass spectrum envelope, power, amplitude spectrum, basic frequency, formant frequency, mel-spectrum envelope, mel-spectrum, and cepstrum. Based on the feature quantity extracted from the digital sound signal, the packetizer 103 determines whether the received digital sound signal is sound of a rhythm instrument. For example, the packetizer 103 refers to a table that correlates a feature quantity and sound of a rhythm instrument. Specifically, the packetizer 103 inputs the feature quantity of the received digital sound signal into the table to search the table for sound of a rhythm instrument corresponding to the feature quantity. In a case where there is sound of a rhythm instrument corresponding to the feature quantity, the packetizer 103 determines that the received digital sound signal is sound of a rhythm instrument. Another possible example is that the packetizer 103 uses a trained model to determine whether the received digital sound signal is sound of a rhythm instrument. The trained model is a model that has been trained to learn a correlation between a feature quantity and sound of a rhythm instrument. The packetizer 103 inputs the feature quantity into the trained model. In a case where "sound of a rhythm instrument" is output as a result of the feature quantity input into the trained model, the packetizer 103 determines that the received digital sound signal is sound of a rhythm instrument.

The communication controller 104 transmits an audio packet with the priority flag with priority over an audio packet without the priority flag.

This ensures that the communication relaying apparatus 1 prioritizes and transmits an audio packet of sound of an instrument deemed important in an ensemble. When the user performs an ensemble with other performers from remote locations, the likelihood of experiencing delays or dropouts of sound deemed important in an ensemble is significantly minimized. This offers the user a customer experience that enables the user to participate in an unconventionally comfortable remote ensemble with other performers.

Figure 13:
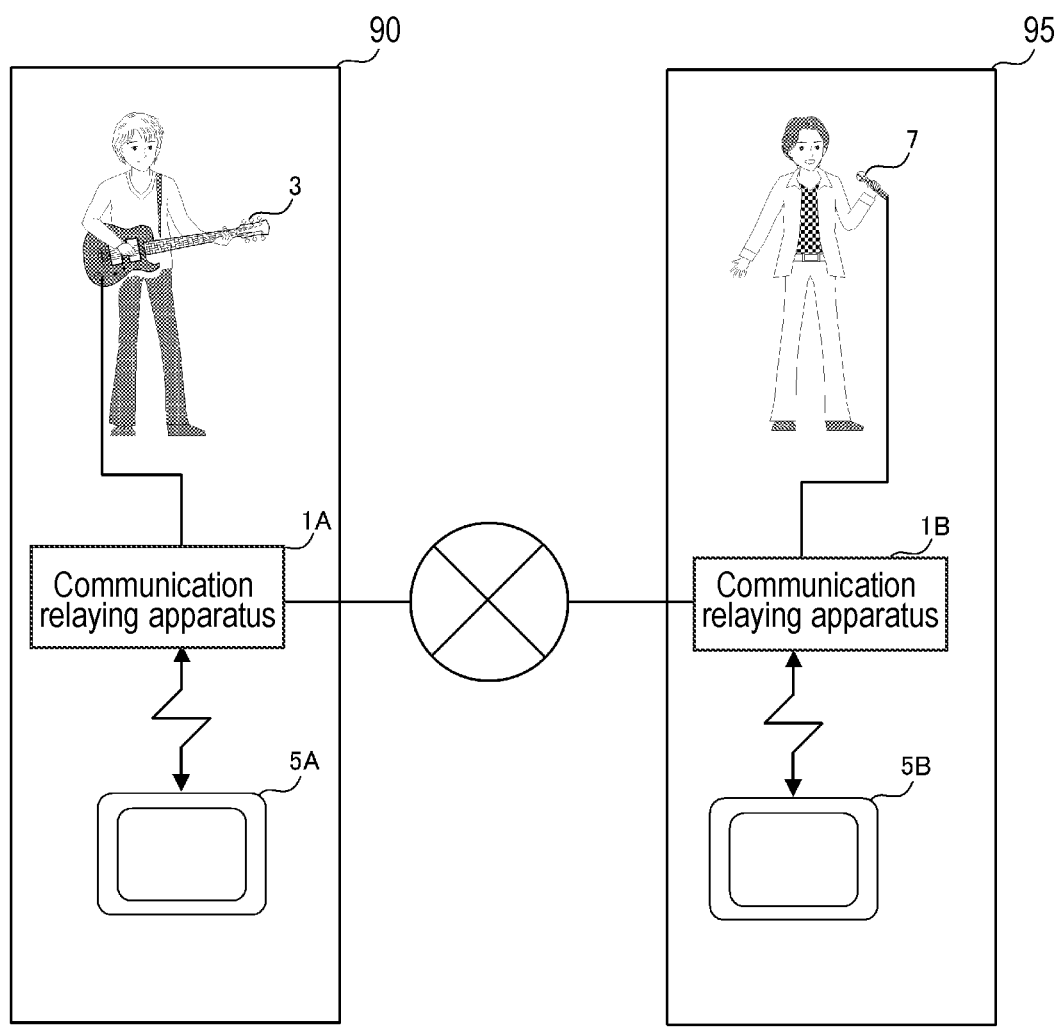
FIG. 13 is a block diagram illustrating a configuration of a network system.

FIG. 13 is a block diagram illustrating a configuration of a network system according to modification 8. The network system according to modification 8 includes a communication relaying apparatus 1A and a communication relaying apparatus 1B. The communication relaying apparatus 1A is provided at a first point 90. The communication relaying apparatus 1B is provided at a second point 95. The communication relaying apparatus 1A and the communication relaying apparatus 1B are identical in hardware configuration to the communication relaying apparatus 1 illustrated in FIG. 1.

A first user of the first point 90 connects an instrument 3 of the first user and a user terminal 5A to the communication relaying apparatus 1A. A second user of the second point 95 connects a microphone 7 of the second user and a user terminal 5B to the communication relaying apparatus 1B.

Figure 14:
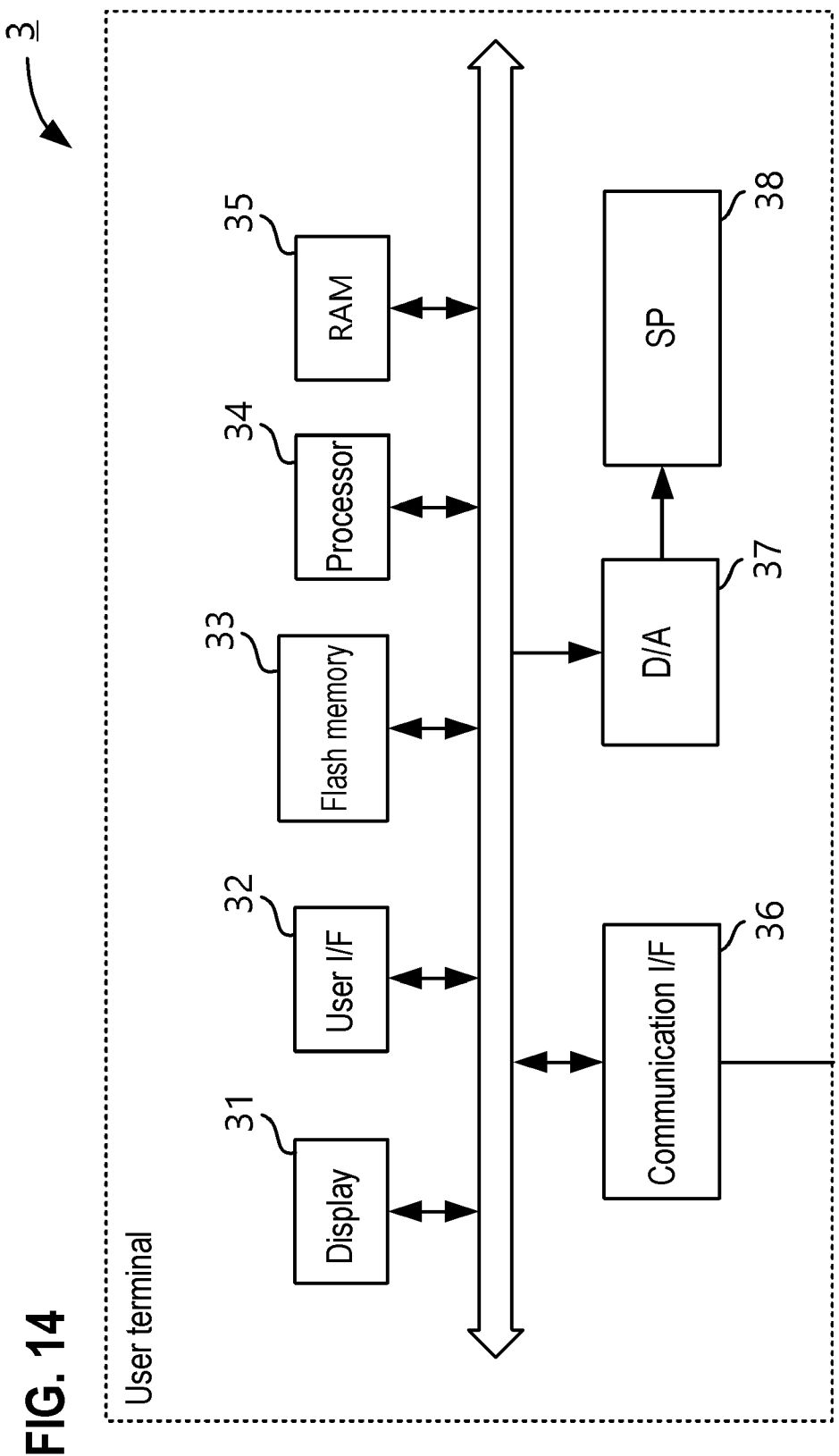
FIG. 14 is a block diagram illustrating a configuration of a user terminal 5A.

FIG. 14 is a block diagram illustrating a configuration of the user terminal 5A. It is to be noted that the user terminal 5B is identical in configuration to the user terminal 5A.

The user terminal 5A is an information processing device such as a personal computer and a smartphone. The user terminal 5A includes a display 31, a user I/F 32, a flash memory 33, a processor 34, a RAM 35, a communication I/F 36, a D/A converter 37, and a speaker (SP) 38.

The display 31 includes an LED, an LCD, or an OLED, and displays various kinds of information. The user I/F 32 is a touch panel provided over the LCD or the OLED of the display 31. Another possible example is that the user I/F 32 is a keyboard or a mouse. In a case where the user I/F 32 is a touch panel, the user I/F 32 constitutes a GUI (Graphical User Interface) together with the display 31.

The processor 34 controller that controls a motion of the user terminal 5A. The processor 34 reads a predetermined program, such as an application program, that is stored in the flash memory 33, which is a storage medium. By reading the program in the RAM 35 and executing the program, the processor 34 performs various operations. In modification 8, the processor 34 reads, in the RAM 35, a remote ensemble application program stored in the flash memory 33. Then, the processor 34 executes the remote ensemble application program.

The user uses the user I/F 32 to specify a remote user located at a remote location. Then, the remote ensemble application program used by the user connects to the remote ensemble application program used by the remote user. In modification 8, the remote ensemble application program of the user terminal 5A and the remote ensemble application program of the user terminal 5B may be connected to each other directly (in a peer-to-peer connection), without server intervention.

Figure 15:
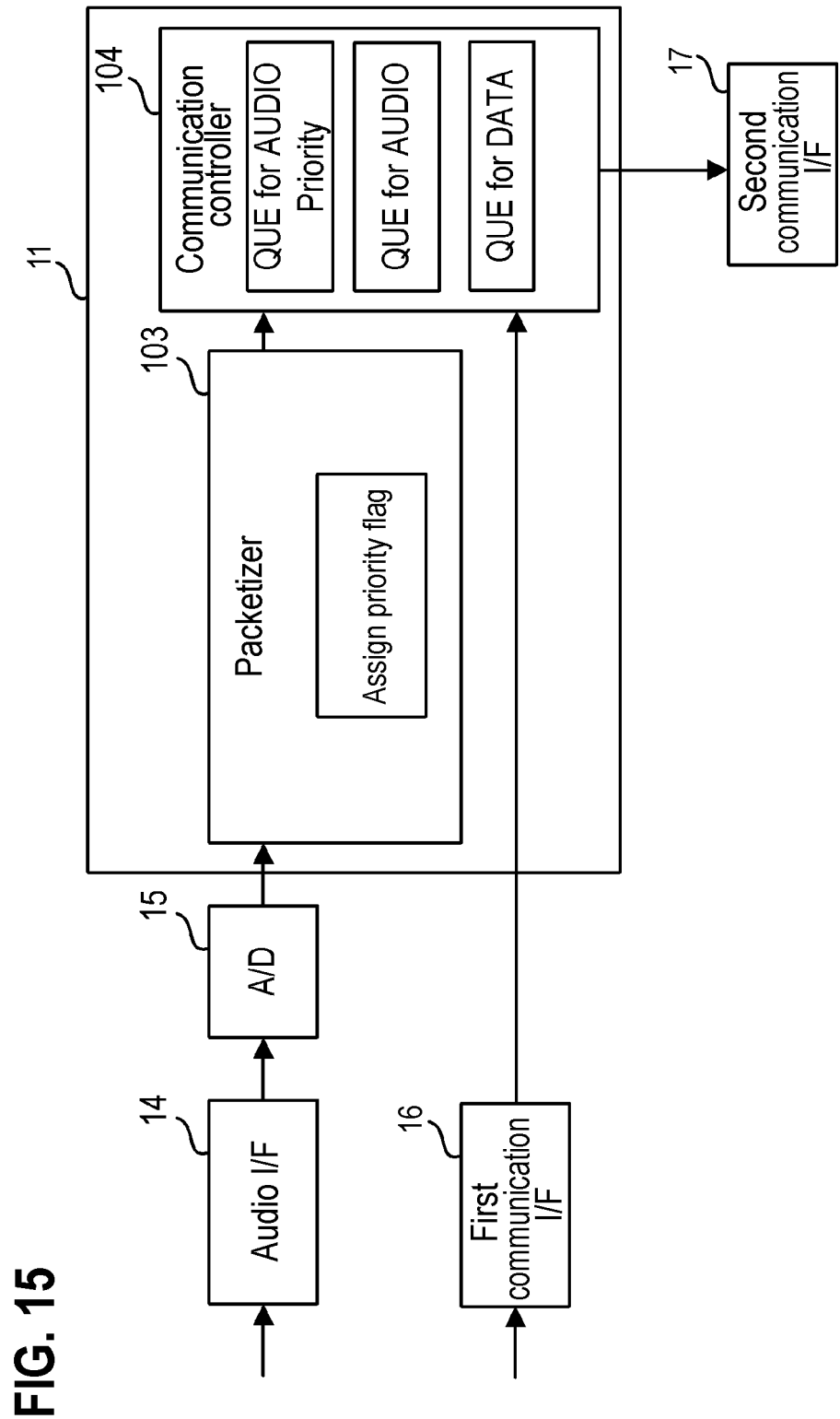
FIG. 15 is a functional block diagram of the processor 11 of a communication relaying apparatus 1A.

FIG. 15 is a functional block diagram of the processor 11 of the communication relaying apparatus 1A according to modification 8. The packetizer 103 of the communication relaying apparatus 1A according to modification 8 assigns a priority flag to a digital sound signal having a predetermined feature. In this manner, the packetizer 103 generates an audio packet (QUE for AUDIO Priority). As used herein, the term "predetermined feature" is intended to mean a feature of sound of a rhythm instrument, as described above. The packetizer 103 uses, for example, a trained model to determine whether the received digital sound signal is sound of a rhythm instrument. The trained model is a model that has been trained to learn a correlation between a feature quantity and sound of a rhythm instrument.

Upon determining that the received digital sound signal is sound of a rhythm instrument, the packetizer 103 assigns a priority flag to the received digital sound signal to generate an audio packet.

Figure 16:
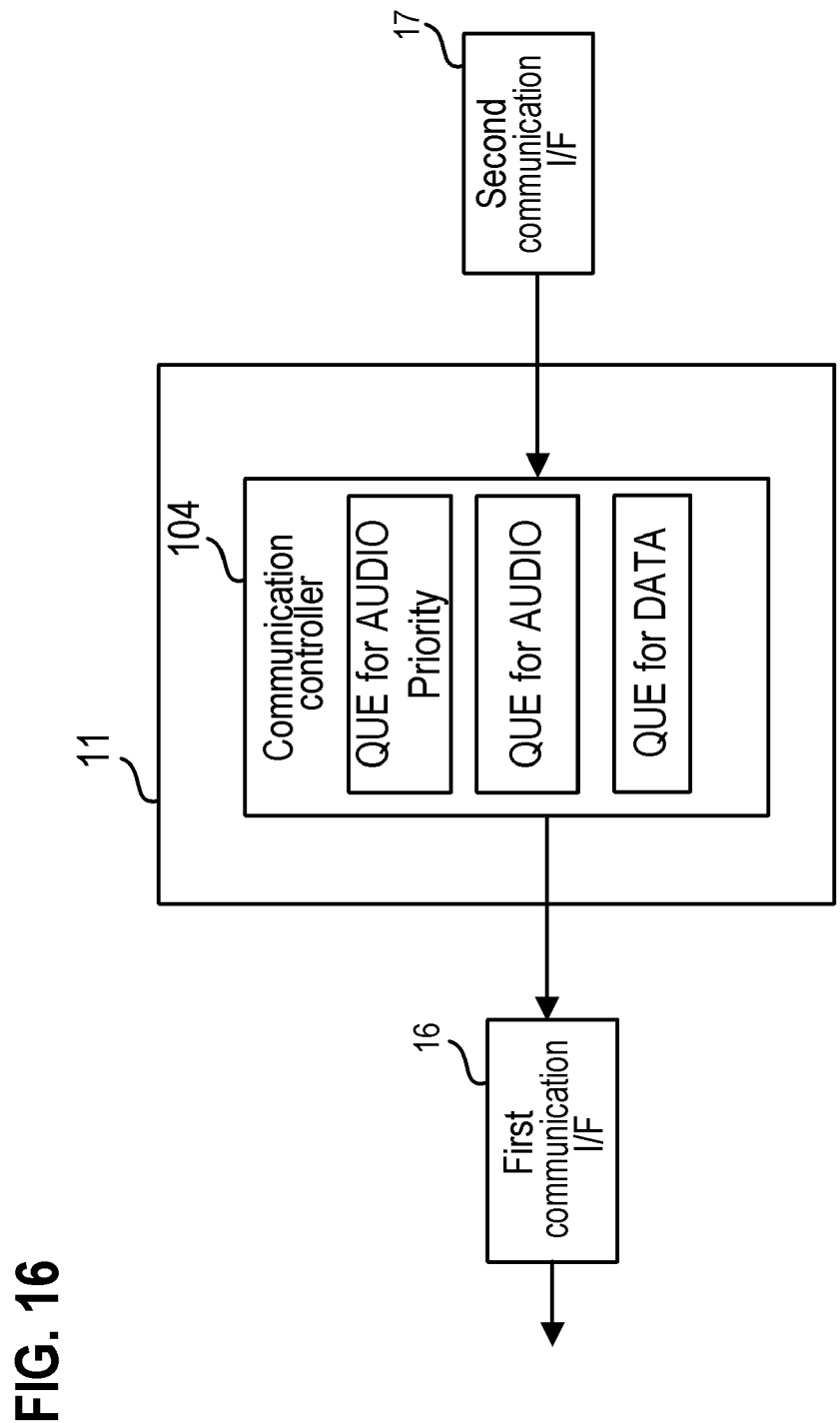
FIG. 16 is a functional block diagram of signal receiving processing performed by the processor 11 of the communication relaying apparatus 1A.

FIG. 16 is a functional block diagram of signal receiving processing performed by the processor 11 of the communication relaying apparatus 1A according to modification 8. The communication controller 104 performs queuing of an audio packet and a data packet received from a transmission-origin communication relaying apparatus.

The communication controller 104 transmits, to the first communication I/F 16, the queue (QUE for AUDIO Priority) of the audio packet with the priority flag with priority over a queue of an audio packet without the priority flag. The communication controller 104 also transmits audio packets to the first communication I/F 16 with priority over data packets.

The first communication I/F 16 transmits the received audio packet to the user terminal 5A. The communication I/F 36 of the user terminal 5A receives the audio packet. The processor 34 (remote ensemble application program) decodes the audio packet into a digital sound signal. The D/A converter 37 converts the digital sound signal into an analogue sound signal. The SP 38 reproduces sound based on the analogue sound signal.

Thus, the user is able to use the remote ensemble application program to perform an ensemble with other performers from remote locations. In modification 8, sound signals output from musical instruments are input into the communication relaying apparatus and transmitted to a remote location without intervention by a user terminal. With this configuration, the network system according to modification 8 further reduces the likelihood of experiencing sound delays or dropouts, as compared with a case where a musical instrument is connected to a user terminal.

Figure 17:
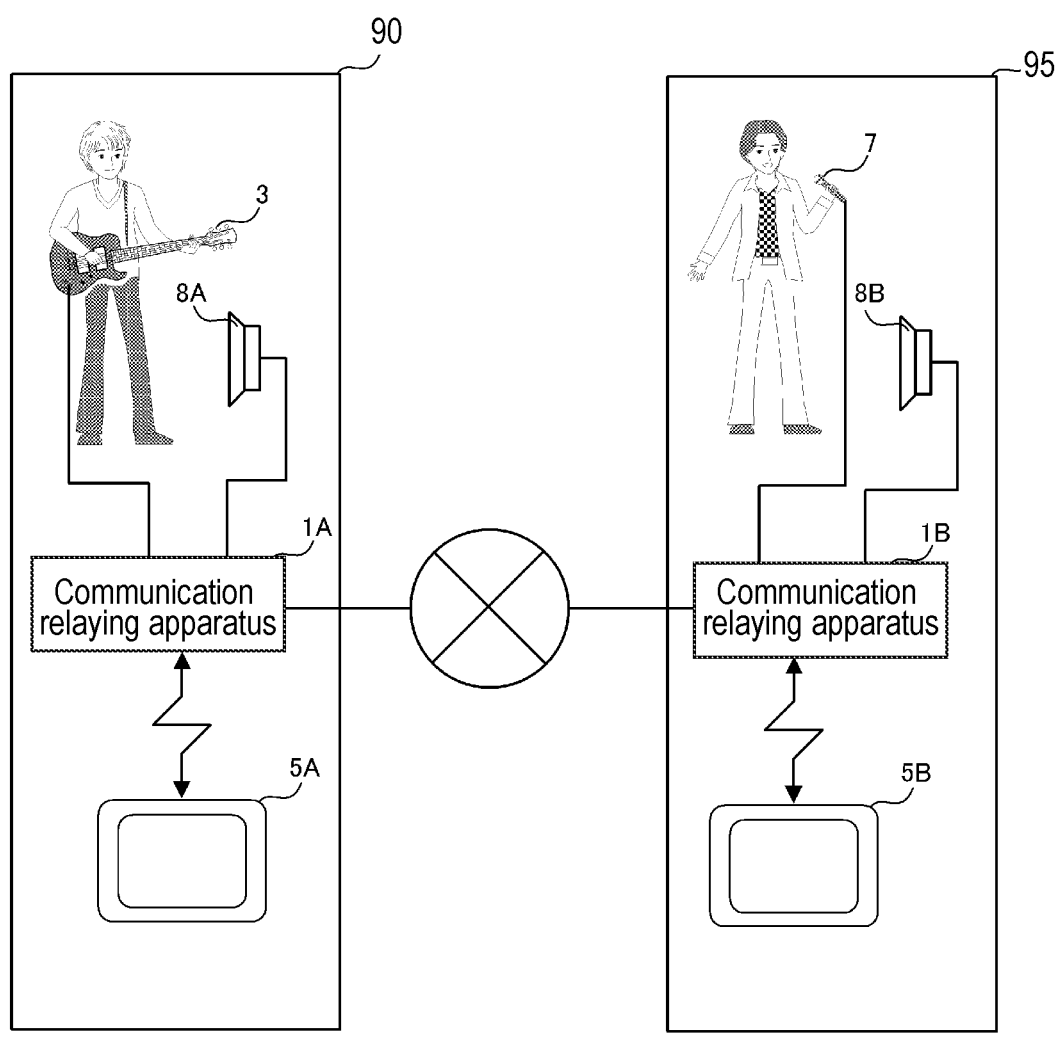
FIG. 17 is a block diagram illustrating a configuration of a network system.

FIG. 17 is a block diagram illustrating a configuration of a network system according to modification 9. The communication relaying apparatus 1A in the network system according to modification 9 is connected to a speaker 8A via the audio I/F 14. The communication relaying apparatus 1B is connected to a speaker 8B via the audio I/F 14. Modification 9 is otherwise similar in configuration to modification 8 illustrated in FIG. 13. In modification 9 as well, the remote ensemble application program of the user terminal 5A and the remote ensemble application program of the user terminal 5B are connected to a remote ensemble application program used by a remote user who is located at a remote location and who has been specified by the users via the user I/F 32.

Figure 18:
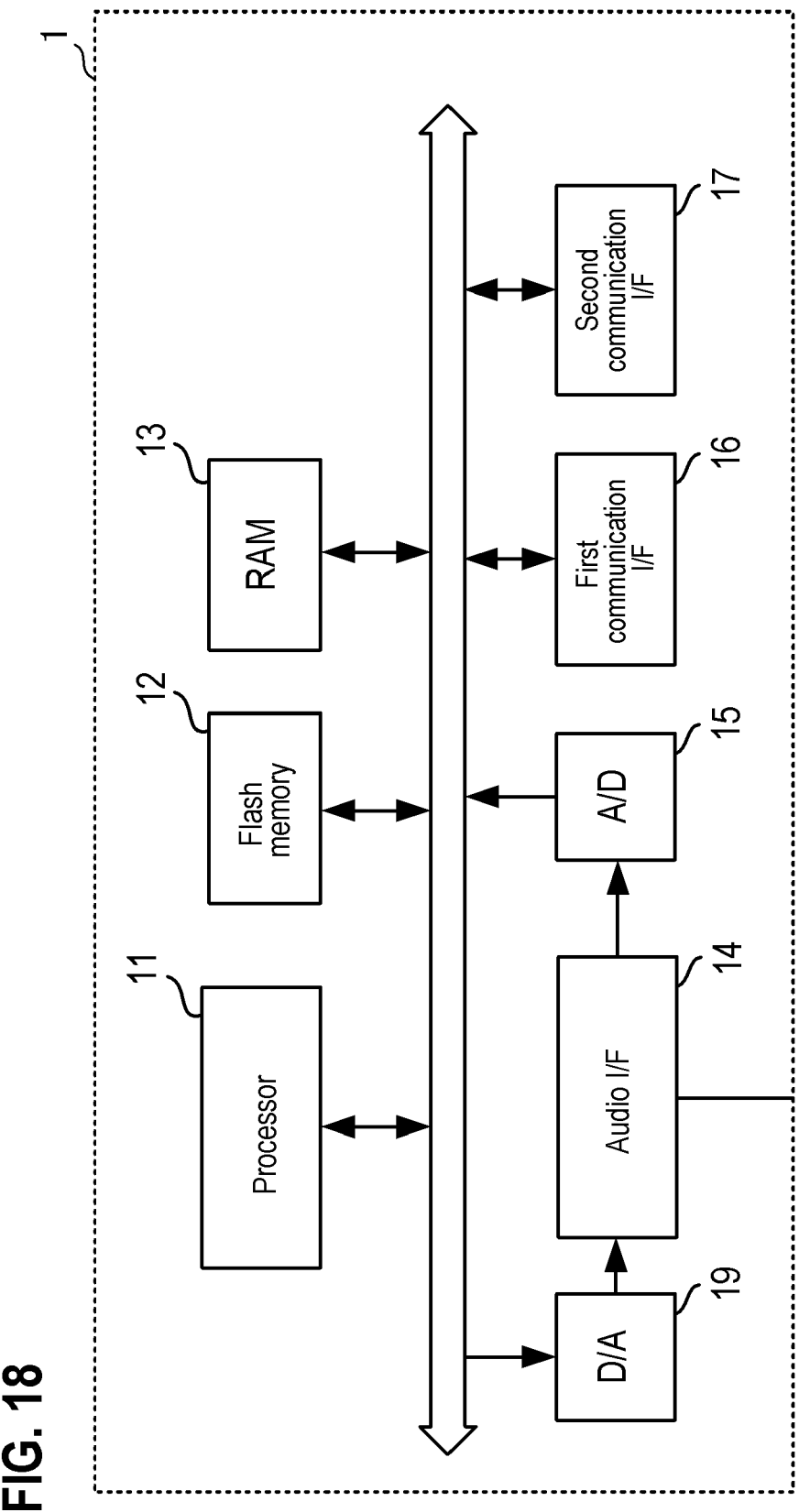
FIG. 18 is a block diagram illustrating a configuration of the communication relaying apparatus 1A.

FIG. 18 is a block diagram illustrating a configuration of the communication relaying apparatus 1A according to modification 9. The communication relaying apparatus 1A and the communication relaying apparatus 1B are identical to each other in hardware configuration.

The communication relaying apparatus 1A according to modification 9 further includes a D/A converter 19. The audio I/F 14 includes an output audio terminal. The user connects the speaker 8A to the output audio terminal.

Figure 19:
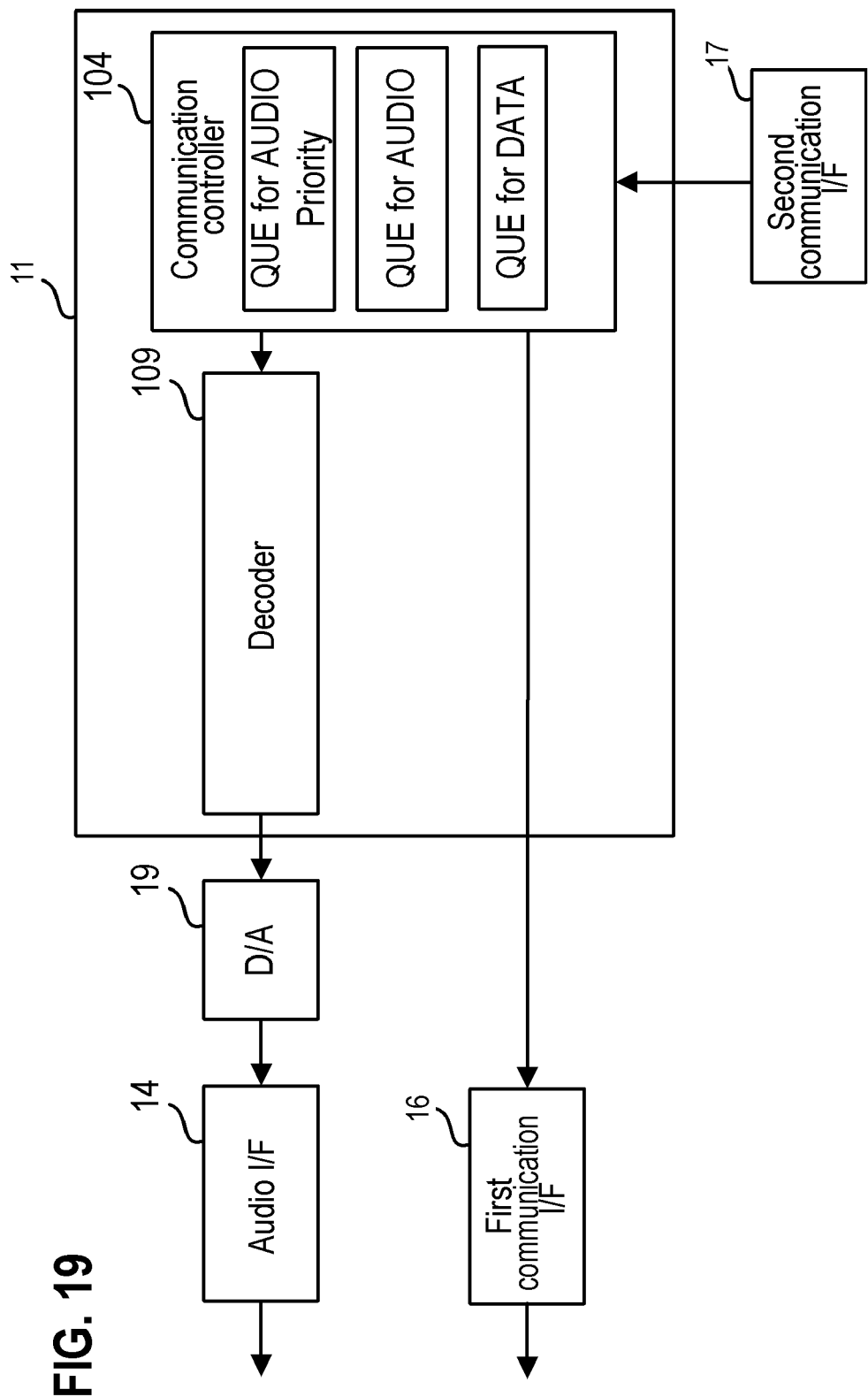
FIG. 19 is a functional block diagram of hardware of the communication relaying apparatus 1A and signal receiving processing performed by the processor 11 of the communication relaying apparatus 1A.

FIG. 19 is a functional block diagram of hardware of the communication relaying apparatus 1A according to modification 9 and signal receiving processing performed by the processor 11 of the communication relaying apparatus 1A according to modification 9. The transmission-related functions of the processor 11 are as illustrated in the functional block diagram of FIG. 15.

The processor 11 according to modification 9 includes a decoder 109. The communication controller 104 performs queuing of an audio packet and a data packet received from a destination communication relaying apparatus.

The communication controller 104 transmits, to the decoder 109, the queue (QUE for AUDIO Priority) of the audio packet with the priority flag with priority over a queue of an audio packet without the priority flag. The communication controller 104 also transmits audio packets to the decoder 109 with priority over data packets.

The decoder 109 decodes the audio packet into a digital sound signal. The D/A converter 19 converts the digital sound signal into an analogue sound signal. The audio I/F 14 outputs the analogue sound signal to the SP 8A. The SP 8A reproduces sound based on the received analogue sound signal.

Thus, the user is able to use the remote ensemble application program to perform an ensemble with other performers from remote locations. In modification 9, an audio packet received from a remote location is output to the audio I/F 14 via the decoder 109 and the D/A converter 19. In modification 9, the remote ensemble application program is only used for connection with a remote ensemble application program used by a remote user who is located at a remote location and who has been specified by the user. That is, the remote ensemble application program does not receive a sound signal that is based on an audio packet received from a remote location. Specifically, in modification 9, a sound signal transmitted from a remote location is input into a reproduction device such as a speaker and a headphone without intervention by a user terminal. With this configuration, the network system according to modification 9 further reduces the likelihood of experiencing sound delays or dropouts as compared with a case where a reproduction device is connected to a user terminal.

In the embodiment and modifications, the following configurations may be employed as a measure to address delays.

(1) A first remote ensemble application program measures communication delay time Tc. The communication delay time Tc is a delay in communication with a second remote ensemble application program at a remote location. Upon receipt of an instruction to reproduce a back performance, the first remote ensemble application program immediately transmits a sound signal of the back performance to the second remote ensemble application program. Upon elapse of the measured communication delay time Tc, the first remote ensemble application program reproduces the sound signal of the back performance. This ensures that the user of the first remote ensemble application program and the user of the second remote ensemble application program are able to listen to the back performance approximately at the same time.

(2) Upon start of communication between the first remote ensemble application program and the second remote ensemble application program, the first remote ensemble application program uses a full-empty counter to measure data accumulation state of a network receiving buffer. Specifically, the first remote ensemble application program measures the number of times the network receiving buffer became full or empty over a predetermined period of time (full-empty count). The first remote ensemble application program adjusts the buffer size based on the measured full-empty count. For example, in a case where the full-empty count is N or more, the first remote ensemble application program increases the buffer size. In a case where the full-empty count is still N or more even if the buffer size has been increased, the first remote ensemble application program further increases the buffer size. In a case where the full-empty count is less than N, the first remote ensemble application program maintains the current buffer size as it is. In a case where the full-empty count is N or more even if the buffer size has been increased to its maximum, the first remote ensemble application program stops the adjustment of the buffer size.

(3) The network system may restrict the number of connectable user terminals to a predetermined restricted number (for example, three). For example, among six user terminals, a first user terminal, a second user terminal, and a third user terminal are directly connected to each other and form a first session room. A fourth user terminal, a fifth user terminal, and a sixth user terminal form a second session room. Then, in a case where a demand occurs in the first session room and the second session room, the first user terminal and the fourth user terminal may be connected to each other. The first user terminal transmits information regarding performance in the first session to the fourth user terminal. The fourth user terminal transmits the received information to the other user terminals in the second session room. The fourth user terminal transmits information regarding performance in the second session to the first user terminal. The first user terminal transmits the received information to the other user terminals in the first session room.

(4) There may be a case where the remote ensemble application program or the communication relaying apparatus are unable to receive a to-be-output sound signal at an appropriate timing. In this case, it is possible for the remote ensemble application program or the communication relaying apparatus to output a replacement sound signal. For example, when the remote ensemble application program or the communication relaying apparatus receives audio packets, the remote ensemble application program or the communication relaying apparatus sequentially writes, into an audio buffer and an interpolation buffer, the received audio packets in the order in which the audio packets were received. Then, the remote ensemble application program or the communication relaying apparatus outputs the audio packets stored in the audio buffer in the order in which the audio packets were stored. When an audio packet awaiting output undergoes a decrease within the audio buffer, the remote ensemble application program or the communication relaying apparatus performs an interpolation to generate a next audio packet to follow the audio packet awaiting output. Specifically, the remote ensemble application program or the communication relaying apparatus generates the next audio packet using an audio packet stored in the interpolation buffer, and writes the next audio packet into the audio buffer. There may be a case where the remote ensemble application program or the communication relaying apparatus detects a lack of audio packet receipt. In this case, the remote ensemble application program or the communication relaying apparatus may copy the audio packets stored in the interpolation buffer into a backup buffer and then clear the interpolation buffer. In a case where the above-described interpolation can not be performed using the audio packet in the interpolation buffer, it is possible for the remote ensemble application program or the communication relaying apparatus to perform the interpolation using the audio packets in the backup buffer.

The configurations to implement the communication relaying method according to the embodiment may not necessarily be incorporated in a single piece of hardware; these configurations may be incorporated in different pieces of hardware. For example, among the configurations illustrated in FIG. 2, the audio I/F 14, the AD converter 15, and the packetizer 103 may be incorporated in an audio IO device, and the communication controller 104 may be incorporated in a router.

The communication relaying apparatus may assign a priority flag to a data packet associated with a (still or moving) image of a conductor (specifically, an image of the conductor's baton or the conductor's hand). In a case where the communication relaying apparatus has received an image data packet, the communication relaying apparatus decodes the image signal. The communication relaying apparatus uses a trained model to determine whether an image of the conductor's baton or the conductor's hand is included in the received image signal. This trained model is a model that has been trained to learn a correlation between a conductor and a feature quantity of an image of the conductor's baton or the conductor's hand. Upon determining that an image of the conductor's baton or the conductor's hand is included in the received image signal, the communication relaying apparatus assigns a priority flag to the data packet. The communication relaying apparatus transmits the queue of the data packet with the priority flag with priority over the queue of a data packet without the priority flag. This significantly reduces the likelihood of experiencing sound delays or dropouts of an image of the conductor, who serves as a basis of an ensemble. This offers the user a customer experience that enables the user to participate in an unconventionally comfortable remote ensemble with other performers.

While embodiments of the present disclosure have been described, the embodiments are intended as illustrative only and are not intended to limit the scope of the present disclosure. It will be understood that the present disclosure can be embodied in other forms without departing from the scope of the present disclosure, and that other omissions, substitutions, additions, and/or alterations can be made to the embodiments. Thus, these embodiments and modifications thereof are intended to be encompassed by the scope of the present disclosure. The scope of the present disclosure accordingly is to be defined as set forth in the appended claims.

What is claimed is:

1. A communication relaying method comprising:
   receiving an analogue sound signal;
   converting the received analogue sound signal into a digital sound signal;
   packetizing the digital sound signal into a first IP packet;
   receiving a second IP packet; and
   transmitting the first IP packet with priority over the second IP packet wherein the analogue sound signal comprises
      a first analogue sound signal received from a first audio interface, and
      a second analogue sound signal received from a second audio interface,
   wherein the digital sound signal comprises
      one second digital sound signal corresponding to the first analogue sound signal, and
      an other second digital sound signal corresponding to the second analogue sound signal, and
   wherein the method further comprises
      in a case where one digital sound signal that is one of the first digital sound signal, the one second digital sound signal, or the other second digital sound signal has a predetermined feature, assigning a priority flag to the one digital sound signal and packetizing the one digital sound signal with the priority flag into a priority-flag first IP packet, and
      transmitting the priority-flag first IP packet with priority over the first IP packet without the priority flag.

2. The communication relaying method according to claim 1, further comprising:
   adding the first IP packet to a first queue; and
   in a case where the first queue has reached a predetermined value, changing a size of the first IP packet.

3. The communication relaying method according to claim 1, further comprising:

adding the first IP packet to a first queue; and
in a case where the first queue has reached a predetermined value, changing flow control of the second IP packet.

4. The communication relaying method according to claim 1, further comprising:
adding the first IP packet to a first queue; and
in a case where the first queue has reached a predetermined value, changing a codec that converts the analogue sound signal into the digital sound signal.

5. The communication relaying method according to claim 1, further comprising:
adding the second IP packet to a second queue; and
in a case where the second queue has reached a predetermined value, changing a size of the first IP packet.

6. The communication relaying method according to claim 1, further comprising:
adding the second IP packet to a second queue; and
in a case where the first queue has reached a predetermined value, changing a codec that converts the analogue sound signal into the digital sound signal.

7. A communication relaying apparatus comprising:
an audio interface configured to receive an analogue sound signal;
an AD converter configured to convert the received analogue sound signal into a digital sound signal;
a packetizer configured to packetize the digital sound signal into a first IP packet;
a communication interface configured to receive a second IP packet; and
a communication controller configured to transmit the first IP packet with priority over the second IP packet, wherein the audio interference comprises
a first audio interface configured to receive a first analogue sound signal, and
a second audio interface configured to receive a second analogue sound signal,
wherein the digital sound signal comprises
one second digital sound signal corresponding to the first analogue sound signal, and
an other second digital sound signal corresponding to the second analogue sound signal,
wherein in a case where one digital sound signal that is one of the first digital sound signal, the one digital sound signal, or the other second digital sound signal has a predetermined feature, the packetizer is configured to:
assign a priority flag to the one digital sound signal; and
packetize the digital sound signal with the priority flag into a priority-flag first IP packet, and
wherein the communication controller is configured to transmit the priority-flag first IP packet with priority over the first IP packet without the priority flag.

8. The communication relaying apparatus according to claim 7, wherein the communication controller is further configured to:
add the first IP packet to a first queue; and
in a case where the first queue has reached a predetermined value, change a size of the first IP packet.

9. The communication relaying apparatus according to claim 7, wherein the communication controller is further configured to:
add the first IP packet to a first queue; and
in a case where the first queue has reached a predetermined value, change flow control of the second IP packet.

10. The communication relaying apparatus according to claim 7, wherein the communication controller is further configured to:
add the first IP packet to a first queue; and
in a case where the first queue has reached a predetermined value, change a codec that converts the analogue sound signal into the digital sound signal.

11. The communication relaying apparatus according to claim 7, wherein the communication controller is further configured to:
add the second IP packet to a second queue; and
in a case where the second queue has reached a predetermined value, change a size of the first IP packet.

12. The communication relaying apparatus according to claim 7, wherein the communication controller is further configured to:
add the second IP packet to a second queue; and
in a case where the first queue has reached a predetermined value, change a codec that converts the analogue sound signal into the digital sound signal.

13. A non-transitory computer-readable recording medium storing a program that, when executed by at least one computer, causes the at least one computer to perform a method comprising:
receiving an analogue sound signal;
converting the received analogue sound signal into a digital sound signal;
packetizing the digital sound signal into a first IP packet;
receiving a second IP packet; and
transmitting the first IP packet with priority over the second IP packet, wherein the analogue sound signal comprises
a first analogue sound signal received from a first audio interference, and
a second analogue sound signal received from a second audio interface,
wherein the digital sound signal comprises
one second digital sound signal corresponding to the first analogue sound signal, and
an other second digital sound signal corresponding to the second analogue sound signal, and
wherein the method further comprises
in a case where one digital sound signal that is one of the first digital sound signal, the one second digital sound signal, or the other second digital sound signal has a predetermined feature, assigning a priority flag to the one digital sound signal and packetizing the one digital sound signal with the priority flag into a priority-flag first IP packet, and
transmitting the priority-flag first IP packet with priority over the first IP packet without the priority flag.

14. The non-transitory computer-readable recording medium according to claim 13, wherein the method further comprises
adding the first IP packet to a first queue, and
in a case where the first queue has reached a predetermined value, changing a size of the first IP packet.

15. The non-transitory computer-readable recording medium according to claim 13, wherein the method further comprises
adding the first IP packet to a first queue; and
in a case where the first queue has reached a predetermined value, changing flow control of the second IP packet.

16. The non-transitory computer-readable recording medium according to claim 13, wherein the method further comprises adding the first IP packet to a first queue; and
in a case where the first queue has reached a predetermined value, changing a codec that converts the analogue sound signal into the digital sound signal.

* * * * *